US005806167A

United States Patent [19]

Yang

[11] Patent Number: 5,806,167

[45] Date of Patent: Sep. 15, 1998

[54] ORNAMENT OF STEEL TUBE FURNITURE FRAME AND METHOD FOR MANUFACTURING THE SAME

[76] Inventor: Hsi-Chin Yang, No. 33-5, HuaMei Lane, ChungChen Road, Taya Hsiang, TaiChung Hsien, Taiwan

[21] Appl. No.: 722,477

[22] Filed: Sep. 27, 1996

[51] Int. Cl.[6] .......... B23P 19/02

[52] U.S. Cl. .......... 29/525; 29/527.5; 164/137

[58] Field of Search .......... 29/527.5, 525, 29/897.312; 164/137, 98

[56] References Cited

U.S. PATENT DOCUMENTS

| | | | |
|---|---|---|---|
| 5,027,497 | 7/1991 | Takaki et al. | 29/527.5 |
| 5,201,108 | 4/1993 | Clark et al. | 29/505 |
| 5,462,108 | 10/1995 | Katon et al. | 164/98 |

*Primary Examiner*—Joseph J. Hail, III
*Assistant Examiner*—I.-H. Lin
*Attorney, Agent, or Firm*—Notaro & Michalos P.C.

[57] ABSTRACT

A steel tube furniture frame ornament includes a first half and a mating second half. The two halves of the ornament have grooves formed on a face thereof confronting each other to define tube extension channel within which a tube of the tube frame is received for mounting the ornament to the tube frame. The confronting face of the first half has at least one pin to extend through a hole formed on the tube and force-fitting into a pin receiving hole formed on the second half so as to secure the ornament to the tube. A method for manufacturing the ornament is also disclosed. The method includes providing a tube having a hole, providing a female die and a mating die having cavities defining the configurations of the first and second halves, pouring melt material into the dies to cast the first and second halves which have pin and pin receiving hole respectively, removing the two halves from the dies after the melt solidifies and then securing the two halves to the tube by having the pin extending through the hole of the tube and force-fitting into the pin receiving hole.

2 Claims, 6 Drawing Sheets

ORNAMENT OF STEEL TUBE FURNITURE FRAME AND METHOD FOR MANUFACTURING THE SAME

FIELD OF THE INVENTION

The present invention relates to an ornament to be mounted to a steel tube furniture frame and a method for manufacturing the steel tube furniture frame ornament.

BACKGROUND OF THE INVENTION

Furniture, such as bed, is usually provided with ornaments on the frame thereof. For furniture made of steel tubes, the ornaments are conventionally directly casted on the tubes, such as that shown in FIG. 1, wherein reference numeral 2 indicates a tube comprised of a bed frame and reference numeral 1 is an ornament to be provided on the bed frame. In directly casting the ornament 1 on the tube 2, a mold comprising two mated die members 4 and 5 are fixed to the tube 2 to interpose the tube 2 therebetween. The mold has formed therein a cavity defining the configuration of the ornament 1 and a pouring gate in communication therewith for receiving melt material therein. Once the casting is completed, a surface finishing operation is performed to remove the casting fins. The surface-finished ornament, together with the bed frame, is then electro-plated. The whole process of the conventional method is quite cumbersome for the bed frame is involved in all the processing steps, including casting, surface finishing and electroplating. It is even more troublesome in forming more ornaments on the bed frame.

Another conventional ornament structure for mounting on a steel tube furniture frame is shown in FIGS. 2A and 2B, wherein the ornament 1 is a two-piece structure and two pieces which are respectively indicated at 1' and 1" in FIG. 2B, are configured to fit over and interpose a portion of the bed frame 2 therebetween. Screws or bolts 3 are used to secure the two pieces 1' and 1" on the bed frame 2. A disadvantage associated with this conventional structure is that the screws or bolts that are used to secure the ornament 1 on the bed frame 2 may gradually get loosened and require re-securing by the user.

It is therefore desirable to provide a steel tube furniture frame ornament structure and a method for manufacturing the same which overcomes the above-mentioned problems encountered in the prior art structure and method.

SUMMARY OF THE INVENTION

The principal object of the present invention is to provide an ornament mounted on a steel tube furniture frame and a method for manufacturing the ornament, which overcomes the drawbacks of the prior art technique and is ready mounted to the tube frame and easy to manufacture, thus lowering down the overall cost.

It is another object of the present invention to provide a method for manufacturing an ornament to be mounted to a steel tube furniture frame, wherein a mold having a cavity with pin-and-hole configuration is provided to directly cast pin and corresponding pin receiving hole on the castings for easily mounting to the tube frame.

It is a further object of the present invention to provide a method for manufacturing an ornament to be mounted to a steel tube furniture frame wherein a die casting step is included in casting the ornament so as to provide the ornament with a finished surface to facilitate electro-plating and coating thereon.

In accordance with the present invention, there is provided a steel tube furniture frame ornament comprising a first half and a mating second half. The two halves of the ornament have grooves formed on a face thereof confronting each other to define tube extension channel within which a tube of the tube frame is received for mounting the ornament to the tube frame. The confronting face of the first half has at least one pin to extend through a hole formed on the tube and force-fitting into a pin receiving hole formed on the second half so as to secure the ornament to the tube. A method for manufacturing the ornament is also disclosed. The method includes providing a tube having a hole, providing a female die and a mating die having cavities defining the configurations of the first and second halves, pouring melt material into the dies to cast the first and second halves which have pin and pin receiving hole respectively, removing the two halves from the dies after the melt solidifies and then securing the two halves to the tube by having the pin extending through the hole of the tube and force-fitting into the pin receiving hole.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
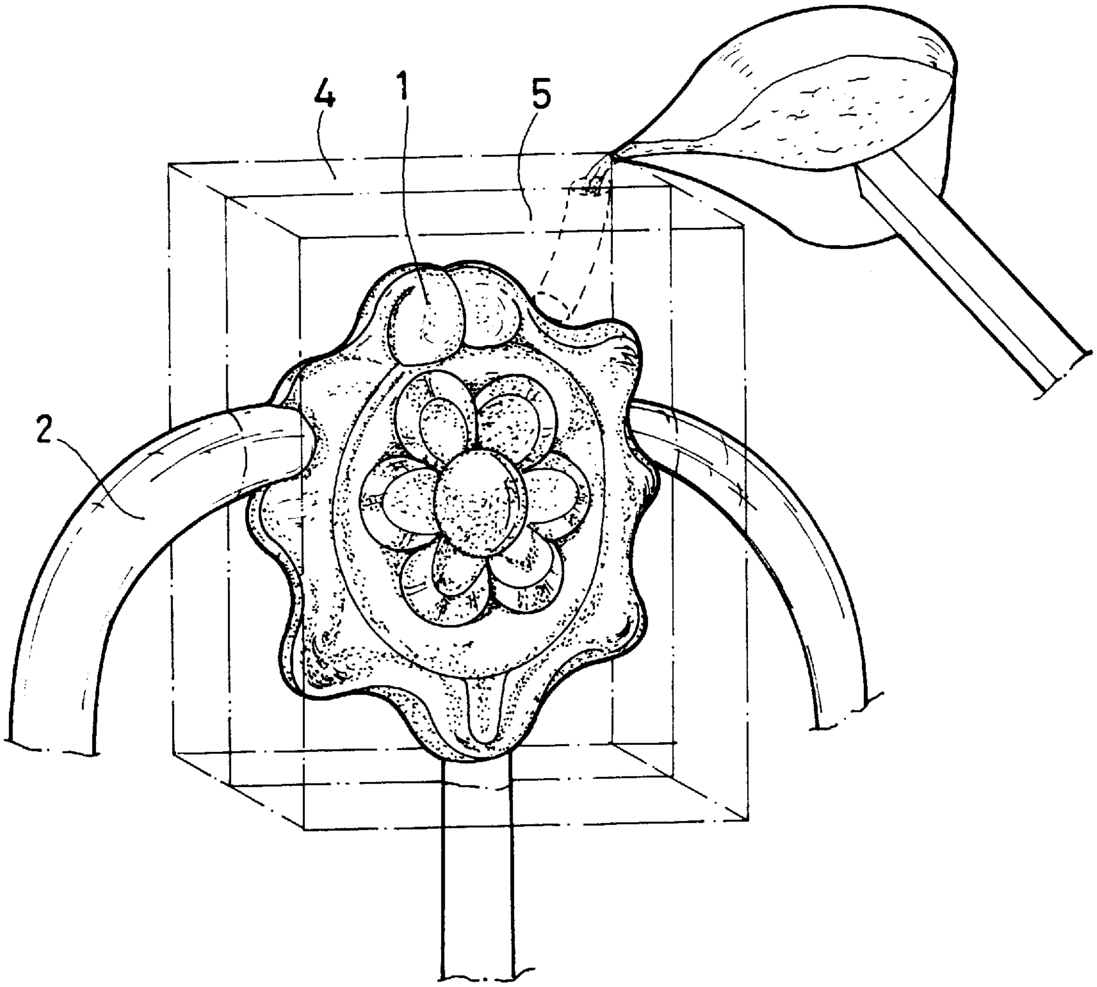
FIG.1 PRIOR ART
FIG. 1 is a perspective view showing a prior art technique in forming an ornament on a steel tube furniture frame.
Figure 2A:
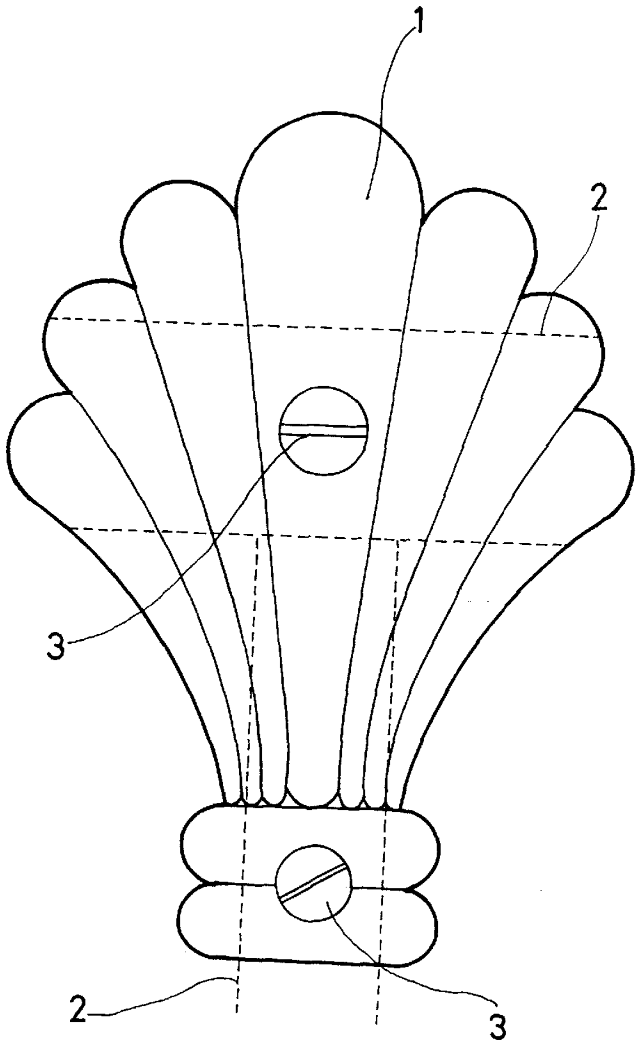
FIGS. 2A and 2B are respectively front view and side view of a second prior art steel tube furniture frame ornament structure wherein screws are used to secure the ornament to the furniture frame.
Figure 2B:
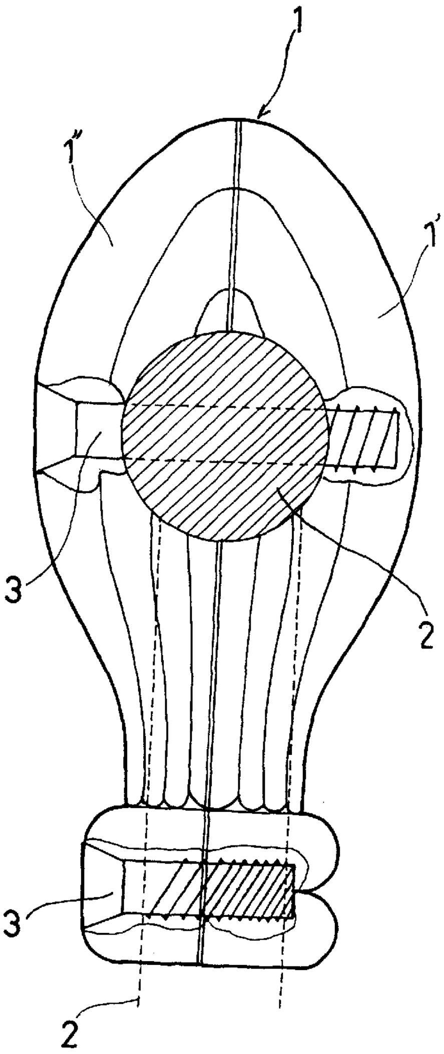
Figure 3:
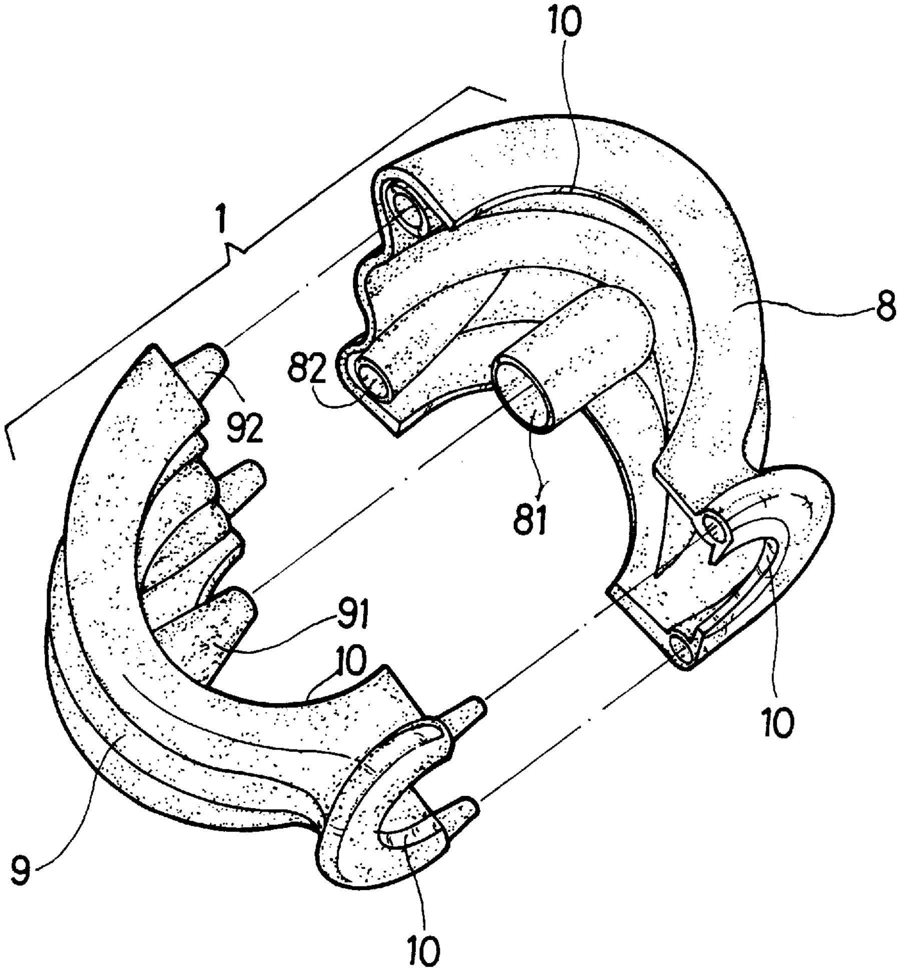
FIG. 3 is a perspective view showing the structure of a steel tube furniture frame ornament constructed in accordance with the present invention.
Figure 5:
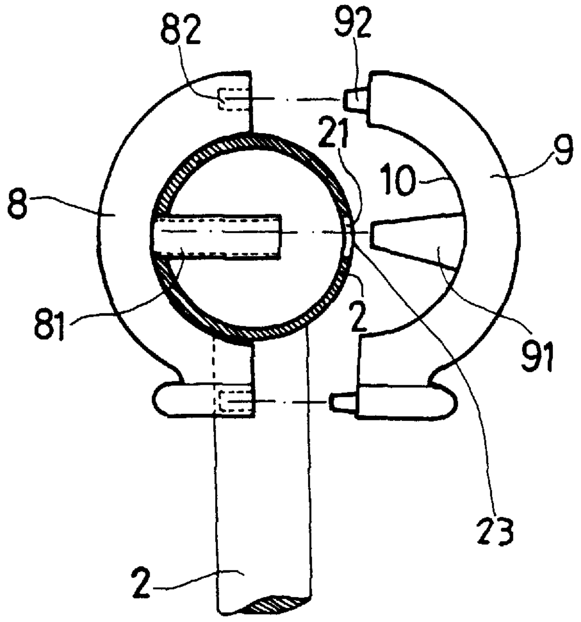
FIG. 5 is a cross-sectional view showing the way to mount the ornament in accordance with the present invention to the steel tube furniture frame.
Figure 6:
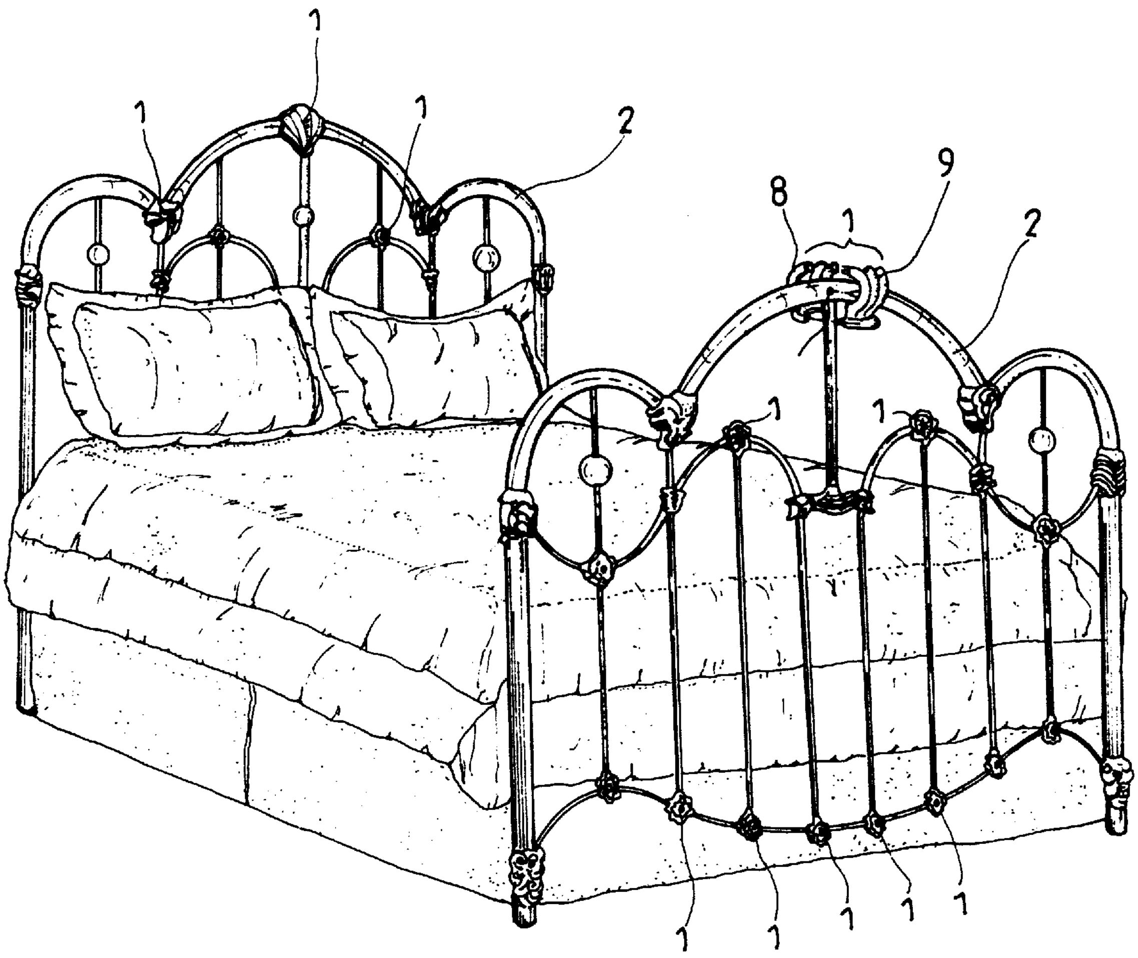
FIG. 6 is a perspective view showing a bed having steel tube frame on which a plurality of ornaments are mounted in accordance with the present invention.

With reference to the drawings and in particular to FIG. 3, wherein an ornament to be mounted to a steel tube frame in accordance with the present invention is shown, the ornament of the present invention being generally designated at reference numeral 1 and the steel tube frame (FIGS. 5 and 6) at reference numeral 2, the ornament 1 comprises two halves, a left half 8 and a right half 10, configured to mate each other and to fit over and interpose a portion of the tube frame 2 therebetween as shown in FIGS. 5 and 6. To fit over the tube frame 2, each of the two halves 8 and 9 is provided with grooves 10 corresponding to the tube frame 2. The grooves 10 are sized to receive the tube frame 2 therein.

One of the two halves, for example the right half 9, is provided with pins 91 and 92 which may be of different sizes on an inward face thereof confronting and mating a corresponding inward face of the other one of the two halves which in this specific example is the left half 8. The left half 8 is provided on the inward face thereof with pin receiving holes 81 and 82 respectively corresponding to the pins 91 and 92 of the right half 9 to receive the pins 91 and 92 therein. The engagement between the pins 91 and 92 and the pin receiving holes 81 and 82, which will be further described, secures the ornament 1 on the tube frame 2.

In the embodiment illustrated, the pins of the right half 9 comprises a central primary pin 91 and a plurality of secondary pins 92 located around the primary pin 91. The left half 8 comprises a hole 81 corresponding to and receiving therein the primary pin 91 and a plurality of secondary holes 82 corresponding to and receiving therein the secondary pins 92.

Figure 4A:
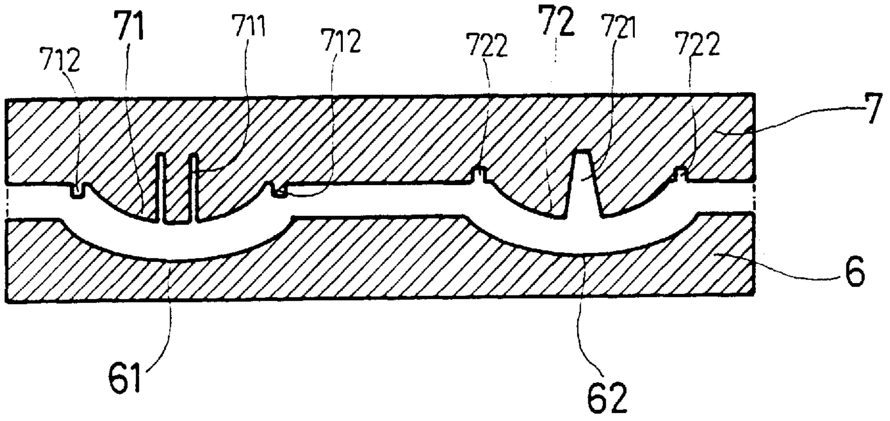
FIGS. 4A and 4B are cross-sectional views respectively showing a mold used to form the ornament of the present invention in an empty condition and a melt occupying condition.
Figure 4B:
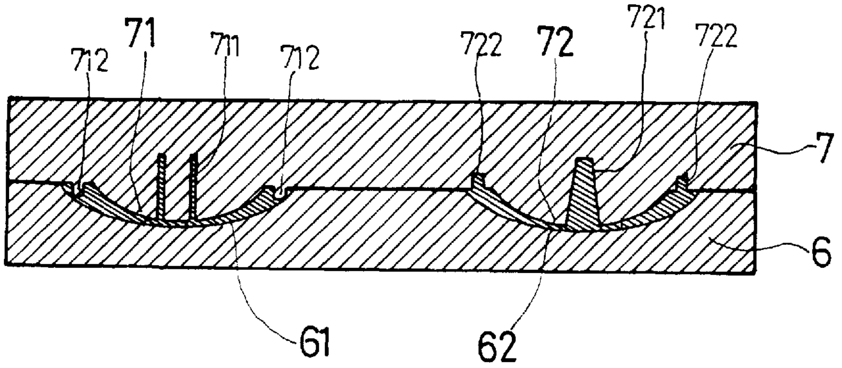

Referring to FIGS. 4A and 4B, in manufacturing the ornament 1, a mold is provided, comprising a male die 7 and mating female die 6. The female die 6 is provided with two cavities 61 and 62, respectively corresponding in configurations to the left half 8 and the right half 9. The male die 7 has two raised portions 71 and 72 corresponding to and receivable into the cavities 61 and 62 to define therebetween the configuration of the left half 8 and the right half 9.

To mold the pins 91 and 92, the raised portion 72 of the male die 7 is provided with a primary bore 721 and a plurality of secondary bores 722, respectively corresponding in size and location to the primary pin 91 and the secondary pins 92. Similarly, the raised portion 71 of the male die 7 is provided with recessed channels 711 and 712 to define the pin receiving holes 81 and 82.

With the two molding dies 6 and 7 engaging each other and pouring melt of metal into the cavities 61 and 62, the left and right halves 8 and 9 may be formed by means of for example die casting.

With reference to FIG. 5, in mounting the ornament 1 to the steel tube frame 2, one of the two halves, for example the left half 8, is first fit over the tube frame 2, the right half 9 is then fit over the tube frame 2 to interpose the tube frame 2 therebetween with the pins 91 and 92 received within the pin receiving holes 81 and 82. The pins 91 and 92 and the pin receiving holes 81 and 82 are configured so that a force-fitting engagement is formed therebetween to securely hold the ornament 1 on the tube frame 2. Preferably, the tube 2 is provided with a through hole 23 (FIG. 5) to allow the primary pin 91 to extend therethrough and engage the primary pin receiving hole 81.

FIG. 6 shows a bed frame which is also designated with reference numeral 2 having mounted thereon a plurality of ornaments 1 which may be of different decorative designs, but have the same pin-and-hole securing structure described above. In accordance with an aspect of the present invention, to secure the plurality of ornaments 1 on the tube frame 2, the two halves 8 and 9 of each of the ornaments 1 is temporarily engaged to each other. A hydraulic press (not shown) is provided to press to all the halves to forcibly fit into each other simultaneously. This enhances the efficiency.

Although a preferred embodiment has been described to illustrate the present invention, it is apparent that changes and modifications in the specifically described embodiment can be carried out without departing from the scope of the invention which is intended to be limited only by the appended claims.

What is claimed is:

1. A method for manufacturing an ornament mounted on a tube frame, the ornament comprising a first half and a second half with tube extension channel formed therein to receive and thus interpose therebetween the tube frame, the first half comprising at least one pin and the second half comprising at least one pin receiving hole corresponding to and receiving therein the pin in a force-fitting manner, the method comprising the steps of:

(1) providing a tube frame comprising at least one tube with a through hole formed thereon;

(2) providing a mold having a male die and a mating female die, the female die having a first cavity corresponding in configuration to the first half and a second cavity corresponding in configuration to the second half, the male die comprising a first raised portion having at least one bore corresponding to the pin of the first half and a second raised portion having at least one recessed channel corresponding to and defining the pin receiving hole of the second half, wherein the cavities of the female die and the raised portions of the male die are configured to provide the tube extension channels on the two halves and corresponding to the tube of the tube frame;

(3) mating the male die and the female die and pouring melt material comprised of the first and second halves to die-cast the first and second halves;

(4) removing the first and second halves from the dies after the melt solidifies;

(5) fitting the first and second halves over the tube to have the tube received within the tube extension channel and thus interpose the tube therebetween with the pin extending through the hole of the tube; and (6) engaging and force-fitting the pin into the pin receiving hole to secure the ornament on the tube.

2. The method as claimed in claim 1, further comprising a step of using a hydraulic press to simultaneously force-fitting the pins of a plurality of the ornament into the corresponding pin receiving holes.

* * * * *